United States Patent
Wach

(10) Patent No.: US 8,979,388 B1
(45) Date of Patent: *Mar. 17, 2015

(54) FIBER OPTIC CONNECTOR SYSTEM WITH PROTECTED ALIGNMENT PINS

(71) Applicant: Michael L. Wach, Alpharetta, GA (US)

(72) Inventor: Michael L. Wach, Alpharetta, GA (US)

(73) Assignee: Cirrex Systems, LLC, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/975,591

(22) Filed: Aug. 26, 2013

Related U.S. Application Data

(63) Continuation of application No. 13/066,931, filed on Apr. 27, 2011, now Pat. No. 8,517,614.

(60) Provisional application No. 61/343,352, filed on Apr. 27, 2010.

(51) Int. Cl.
*G02B 6/38* (2006.01)

(52) U.S. Cl.
CPC ...................................... *G02B 6/387* (2013.01)
USPC .................................. 385/59; 385/60; 385/64

(58) Field of Classification Search
CPC ... G02B 6/3885; G02B 6/3821; G02B 6/3893
USPC .......................................... 385/59–60, 62–65
See application file for complete search history.

(56) References Cited

U.S. PATENT DOCUMENTS

| 5,214,730 A | 5/1993 | Nagasawa et al. |
| 5,838,856 A | 11/1998 | Lee |
| 6,579,014 B2* | 6/2003 | Melton et al. ................... 385/76 |
| 6,934,450 B2* | 8/2005 | Hiramatsu ..................... 385/52 |
| 7,044,650 B1* | 5/2006 | Tran et al. ....................... 385/76 |
| 7,192,196 B2 | 3/2007 | Sasaki et al. |
| 7,207,727 B2* | 4/2007 | Tran et al. ....................... 385/76 |

OTHER PUBLICATIONS

U.S. Official Action dated Oct. 19, 2012 in U.S. Appl. No. 13/066,931.
U.S. Notice of Allowance dated Apr. 30, 2013 in U.S. Appl. No. 13/066,931.

* cited by examiner

*Primary Examiner* — Ellen Kim
(74) *Attorney, Agent, or Firm* — Ascenda Law Group, PC

(57) ABSTRACT

A fiber optic link connection system facilitates connection between two arrays of optical fibers. Two female-type connector plugs, each attached to a respective end of two fiber optic arrays, are inserted into the open ends of a connector guide sleeve. Two guide pins are captured by intrusions within the guide sleeve in order to mate with and align the two plugs. Guide capture pins and associated springs are disposed within the guide pin intrusions to capture the guide pins. Such an arrangement not only protects the guide pins from damage, but also promotes connector compatibility.

23 Claims, 5 Drawing Sheets

FIBER OPTIC CONNECTOR SYSTEM WITH PROTECTED ALIGNMENT PINS

CROSS REFERENCE TO RELATED APPLICATIONS

This application is a continuation of U.S. patent application Ser. No. 13/066,931, entitled "Fiber Optic Connector Assembly with Protected Alignment Pins", filed Apr. 27, 2011 in the name of Michael L. Wach, now U.S. Pat. No. 8,517,614, which claims priority to U.S. Provisional Patent Application No. 61/343,352, entitled "Fiber Optic Connector Assembly with Protected Alignment Pins", filed Apr. 27, 2010 in the name of Michael L. Wach, the entire contents of both of which are hereby incorporated herein by reference.

FIELD OF THE TECHNOLOGY

The present technology generally relates to the field of fiber optics and more specifically to systems for coupling fiber optic arrays to one another using female-to-female mating.

BACKGROUND

Many conventional linking and connecting devices for joining two lengths of fiber are lacking in terms of facilitating economical mass production of replaceable components. Many are also lacking for connecting fiber optic cables with precise alignment and without undue signal degradation. Individual components of many conventional optical connection systems are extremely small and technically complex. Differences between components when such components are not directly interchangeable can be problematic in a replacement or repair situation, for example causing delay, including loss of a link's full bandwidth, while fumbling with components.

It is typically useful to have the butted faces of connected optical fibers precisely aligned and mated for signal propagation and transmission without loss or failure. It is generally desirable for a connected assembly to function as one continuous link with minimal interruption at the connection. Improper alignment or inadequate connection of individual fiber optic links of an arrayed system may cause loss of data integrity, reduction of signal strength, or degradation of function. Such factors can play a role in precise linking and mating of signal-carrying fiber optic links.

Also relevant to meeting the increasing demand of fiber optic components is a capability for high-volume production of substantially identical components that are interchangeable and thus easily replaceable and facilitate repair without undue reliance on unique or select parts that may or may not be available. Many conventional approaches involve exact, select components for replacement or repair as the components may lack interchangeability. Accordingly, compatibility of components and parts of a connection assembly is often desirable to facilitate expeditious repair or replacement.

Certain conventional fiber optic connectors include guide pins projecting from a connector plug, in the format of a male-type connector plug, that corresponds with a mated plug (e.g., a female-type connector plug), which has holes to receive the guide pins. Although such guide pins may aid in maintaining alignment and stability, such connectors may pose several issues relevant to many applications. Pins that are exposed can be broken off, damaged, or bent, disrupting alignment. Certain conventional pins may have a large diameter to resist damage, which can be undesirable for miniaturization pertinent to many fiber optic applications.

Further, conventional male-to-female connector systems can create compatibility issues. The opposing ends of a conventional fiber optic jumper might be male-male, male-female, or female-female, and each end may need to mate with a properly sexed end of another jumper or cable. Should such a conventional connector plug or jumper fail, repair would typically call for an appropriate match for replacement. Accordingly, a substantial supply of jumpers and components having varied permutations and combinations of sexed ends would often be maintained for sparing and as replacements in a conventional situation. Lacking interchangeable components, link and service could be disrupted for an undetermined period. Having parts with improved interchangeability or a fully compatible mating system would facilitate faster and easier repair and replacement. Further, pins protruding from the face of a connector plug can add labor to certain field operations, such as end face polishing at an installation site.

U.S. Pat. No. 5,214,730 discloses a conventional fiber optic connector technology and is hereby incorporated herein by reference in its entirety. U.S. Pat. No. 5,214,730 discloses a connecting system with guide pins that can be susceptible to damage due to exposure.

It would be advantageous to improve the connection technology disclosed in U.S. Pat. No. 5,214,730 and other conventional fiber optic connectors. For example, it would be advantageous to provide a firm and robust connection for two fiber segments and a connector apparatus with interchangeable and compatible parts that facilitate repair and replacement. It would also be advantageous for the components to be mass produced economically at high volume to meet the increasing demand for readily available components for fiber optic systems. It would also be advantageous to have a connector system in which alignment pins are physically shielded from damage. It would also be advantageous to have a connector system that could mate two female connectors repeatedly, maintaining good signal characteristics over numerous connect-disconnect cycles. One or more such improvements could support enhanced installation and application.

Embodiments of the present invention, described in more detail below, can provide improvement over conventional fiber optic link-connecting apparatuses.

SUMMARY

In accordance with certain aspects of the present invention, a fiber optic connection assembly can support stable connection, ruggedness, interchangeability, field service, and/or economical manufacture.

In one aspect of the present invention, a fiber optic connector system can comprise a sleeve and two plugs sized for insertion in opposite ends of the sleeve. The sleeve can retain at least one alignment pin within a bore of the sleeve, with one end of the alignment pin extending towards a first end of the sleeve and an opposite end of the alignment pin extending towards a second end of the sleeve. A first array of optical fibers can terminate at a first of the two plugs, and a second array of optical fibers can terminate at a second of the two plugs. Each array can comprise a ribbon of optical fibers, such as eight, sixteen, or thirty two optical fibers in a linear array, or a stack of such ribbons forming a two-dimensional array, for example. Each plug can comprise a respective hole sized and positioned to receive a respective end the alignment pin upon plug insertion in the sleeve.

The discussion of connection technology presented in this summary is for illustrative purposes only. Various aspects of the present invention may be more clearly understood and appreciated from a review of the following detailed description of the disclosed embodiments and by reference to the figures and claims. Other aspects, systems, processes, methods, features, advantages, benefits, and objects of the present invention will become apparent to one of ordinary skill in the art upon examination of the following detailed description and the accompanying figures. It is intended that all such aspects, systems, processes, methods, features, advantages, benefits, and objects are to be included within this description, are to be within the scope of the present invention, and are to be protected by the accompanying claims.

Figure 1:
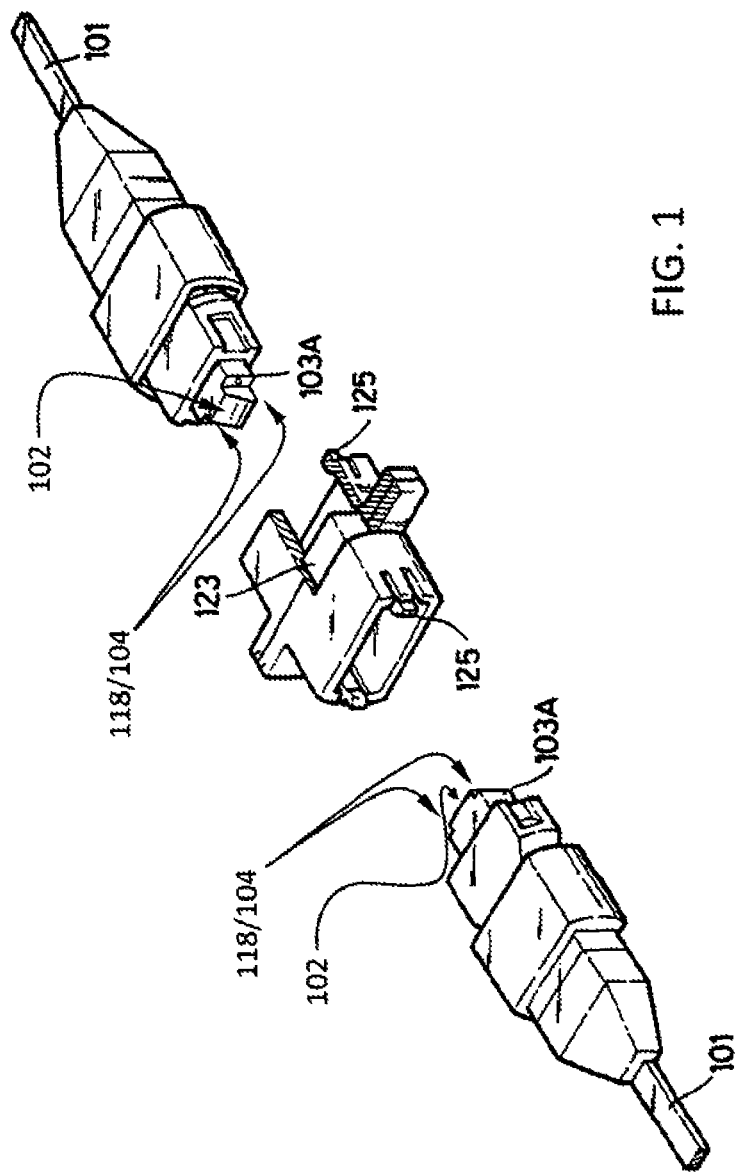
FIG. 1 illustrates a connection apparatus for a fiber optic connector using a guide sleeve with engagement hooks in accordance with certain exemplary embodiments of the present invention.

Many aspects of the present invention can be better understood with reference to the above figures. The elements and features shown in the figures are not necessarily to scale, emphasis instead being placed upon clearly illustrating principles of exemplary embodiments of the present invention. Moreover, certain dimensions may be exaggerated to help visually convey such principles. In the figures, reference numerals designate like or corresponding, but not necessarily identical, elements throughout the several views.

DETAILED DESCRIPTION OF EXEMPLARY EMBODIMENTS

Exemplary embodiments of the present system support connecting arrays of optical fibers to one another in a manner that is robust, rugged, and compact, and that is conducive to economical mass production, reliability, serviceability and connection repeatability.

The present invention can be embodied in many different forms and should not be construed as limited to the embodiments set forth herein; rather, these embodiments are provided so that this disclosure will be thorough and complete, and will fully convey the scope of the invention to those having ordinary skill in the art. Furthermore, all "examples," "embodiments," and "exemplary embodiments" given herein are intended to be non-limiting, and among others supported by representations of the present invention.

One exemplary embodiment of the invention can comprise a fiber optic connector system, comprising: two fiber optic connector plugs, each attached at a respective end of a respective fiber optic cable segment, and each comprising: a face from which an array of optical fibers extends; and a first hole sized to receive a first guide pin and a second hole sized to receive a second guide pin; and a sleeve comprising opposite ends sized to receive the two fiber optic connector plugs, wherein said sleeve captures said first and said second guide pins independent from receiving said two fiber optic connector plugs.

In a further exemplary embodiment of the invention, said first and second guide pins are circumferentially indented substantially at their midpoints. In a further exemplary embodiment of the invention, said sleeve comprises a first intrusion and a second intrusion disposed substantially at a midpoint of said sleeve along one or more side walls. In a further exemplary embodiment of the invention, each of the fiber optic connector plugs comprises a first notch on one side of the face and a second notch on a second side of the face with the first hole disposed in the first notch and the second hole disposed in the second notch. In a further exemplary embodiment of the invention, said first and said second notches are sized to seal with said first and said second intrusions. In a further exemplary embodiment of the invention, said sleeve further comprises a spring disposed in said first intrusion. In a further exemplary embodiment of the invention, said first and said second intrusion each contains a guide capture pin. In a further exemplary embodiment of the invention, said spring is coupled to said guide pin capture pin. In a further exemplary embodiment of the invention, said first intrusion has a circular hole sized to receive said first guide pin.

One exemplary embodiment of the invention comprises a fiber optic connector and alignment assembly comprising: a first and a second fiber optic connector plug, each comprising a face, a first and a second guide pin insertion hole, and a first and second notch at opposing face edges; a guide sleeve adapted to engage each said first and said second fiber optic connector plugs for face-to-face alignment; and a first and a second guide pin retained in the guide sleeve independent of said first and second fiber optic connector plug.

In a further exemplary embodiment of the invention, said guide sleeve comprises first and second intrusions disposed within and oriented for receiving said first and second notches. In a further exemplary embodiment of the invention, each said first and said second intrusion comprises a circular guide pin insertion hole. In a further exemplary embodiment of the invention, said first and said second intrusions each contains a guide-pin capture pin. In a further exemplary embodiment of the invention, said first and said guide pins are circumferentially indented substantially along their midpoints. In a further exemplary embodiment of the invention, said first and second intrusions each comprise a respective spring. In a further exemplary embodiment of the invention, said guide sleeve further comprises guide pin openings disposed in said first and second intrusions.

One exemplary embodiment of the invention comprises a fiber optic connection system, comprising: a first array of optical fibers leading to and terminating substantially at a first face of a first connector; a second array of optical fibers leading to and terminating substantially at a second face of a second connector; and a sleeve comprising: a first aperture sized to receive the first connector; a second aperture sized to receive the second connector; and a plurality of pins disposed between the first aperture and the second aperture, wherein the sleeve captures the pins, and wherein the first connector comprises a plurality of holes respectively sized to receive first ends of the plurality of pins when the first connector is inserted in the first aperture, and wherein the second connector comprises a plurality of holes respectively sized to receive second ends of the plurality of pins when the second connector is inserted in the second aperture.

In a further exemplary embodiment of the invention, lateral force applied to each pin retains each pin within the sleeve while allowing each pin to pivot, wherein the first array of optical fibers comprises a two-dimensional array of optical fibers, and wherein the second array of optical fibers comprises another two-dimensional array of optical fibers. In a further exemplary embodiment of the invention, the captured pins have substantial pivoting play or freedom of tilting motion relative to the sleeve while the first aperture and the second aperture are open, and wherein the first array of optical fibers comprises a linear array. In a further exemplary embodiment of the invention, lateral force applied to each pin retains each pin within the sleeve while allowing each pin to pivot, wherein the first array of optical fibers comprises a two-dimensional array of optical fibers, and wherein the second array of optical fibers comprises another two-dimensional array of optical fibers.

Turning now to the drawings, FIG. 1 describes a system for connecting arrays of optical fibers in accordance with a first exemplary embodiment of the present invention. FIGS. 2, 3, 4, and 5 describe another system for connecting arrays of optical fibers in accordance with a second exemplary embodiment of the present invention.

FIG. 1 is a perspective view of a connection apparatus for a fiber optic connection using a guide sleeve 123 in accordance with an exemplary embodiment of the present invention. The illustrated embodiment can be viewed as an improvement over the disclosure of U.S. Pat. No. 5,214,730, the entire contents of which are hereby incorporated herein by reference. The fiber optic connection system illustrated in FIG. 27 of U.S. Pat. No. 5,214,730 has been improved by providing notches 118 in the multiple fiber connector plugs 103A, with a respective guide pin insertion hole 104 in each notch 118. One of ordinary skill in the art having benefit of the present teaching will further appreciate that the present technology is applicable to the other, various connectors and related systems disclosed in the U.S. Pat. No. 5,214,730 and that the present disclosure includes all resulting combinations.

Guide pins (not visible) that mate with the guide pin insertion holes 104 are retained in the guide sleeve 123. The guide sleeve 123 contains intrusions (not visible) that capture and retain the guide pins, such that the guide pins stay with the guide sleeve 123 independent of whether the multiple fiber connector plugs 103A are inserted or removed from the guide sleeve 123. The notches 118 accommodate the intrusions when the multiple fiber connector plugs 103A are inserted in the guide sleeve 123. As will be discussed in further detail below, FIGS. 2, 3, 4, and 5 describe exemplary embodiments of such intrusions and guide pins.

As illustrated in FIG. 1, two multiple fiber connector plugs 103A are attached to respective ends of optical fiber ribbons 101. Each multiple fiber connector plug 103A comprises a pair of guide pin insertion holes 104 located in notches 118, with the ends of optical fibers 102 located between the notches 118. The optical fibers 102 can project slightly out of the faces of the multiple fiber connector plugs 103A. The guide sleeve 123 forms a connection via aligning, adjoining, and mating the two multiple fiber connector plugs 103A.

The guide sleeve 123 has an opening or aperture on each end such that each multiple fiber connector plug 103A can be inserted into each end of the guide sleeve 123. The faces of the multiple fiber connector plugs 103A can be slanted such that one multiple fiber connector plug 103A is upside down relative to the other multiple fiber connector plug 103A when the multiple fiber connector plugs 103A are inserted in the guide sleeve 123. So inserted, the faces of each multiple fiber connector plug 103A abut and press against each other. Before the multiple fiber connector plugs 103A are inserted into the guide sleeve 123, guide pins (not illustrated in FIG. 1) are inserted into and captured and retained by the guide sleeve 123, as will be discussed in further detail below.

Each multiple fiber connector plug 103A is inserted into an opposing end of the guide sleeve 123 and engages a respective pair of engagement hook members 125. Upon insertion, the guide pins that are disposed within the guide sleeve 123 align with and are inserted into the guide pin insertion holes 104 by force and effort of inserting the multiple fiber connector plugs 103A. As will be discussed in further detail below, the guide pins typically have some play within the guide sleeve 123 to facilitate pin-to-hole mating. Upon insertion, multiple fiber connector plug 103A engages engagement hook members 125. The engagement hook members 125 retain the multiple fiber connector plugs 103A within the guide sleeve 123 and maintain contact and pressure between the faces of the abutting multiple fiber connector plugs 103A to facilitate robust optical coupling.

Figure 2:
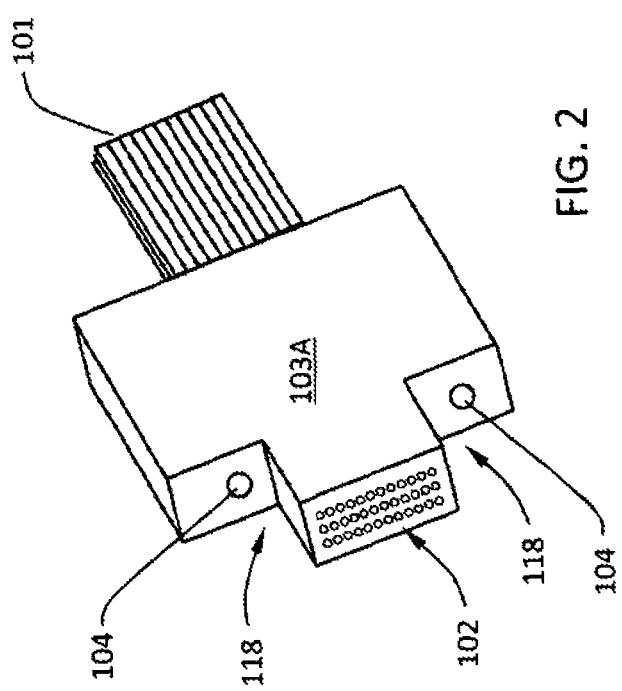
FIG. 2 illustrates a perspective view of an embodiment of a multiple fiber optic connector plug in accordance with certain exemplary embodiments of the present invention.

Turning now to FIGS. 2, 3, 4, and 5, another exemplary embodiment according to the invention will be discussed, and additional details regarding the embodiment of FIG. 1 will be provided. FIG. 2 shows a perspective view of an exemplary embodiment of a multiple fiber connector plug 103A in accordance with the present invention. Each multiple fiber connector plug 103A is positioned at the end of a respective stack of optical fiber ribbons 101, comprising a two-dimensional array of optical fibers 102. The multiple fiber connector plug 103A has a flat face, from which projects (slightly) the individual optical fibers 102 to be joined. On either side of the optical fibers 102, the multiple fiber connector plug 103A comprises a respective notch 118 such that the length of each side of the multiple fiber connector plug 103A is shortened relative to the face.

Further included in the multiple fiber connector plug 103A are guide pin openings 104 on either side of the optical fibers 102. The guide pin insertion holes 104 are located in the notches 118.

Figure 3:
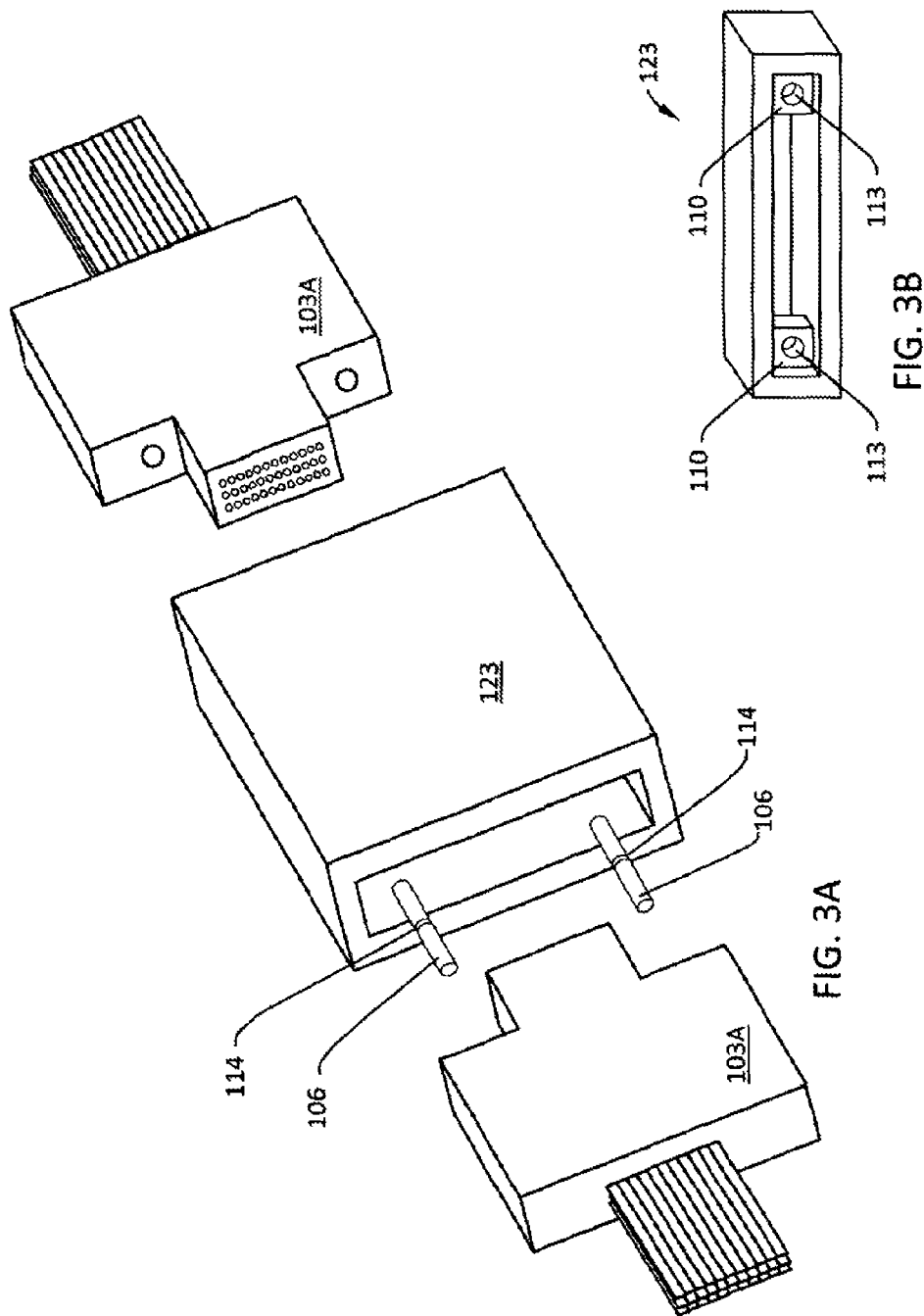
FIGS. 3A and 3B (collectively, FIG. 3) illustrate in perspective view an embodiment of an alignment connector assembly ("exploded" and in a disconnected state) for multiple optical fibers in accordance with certain exemplary embodiments of the present invention.

Now referring to FIG. 3, a perspective view of an exemplary embodiment of a fiber optic connector assembly in accordance with the present invention is shown, in exploded format. In FIG. 3B, the guide sleeve 123 is oriented for viewing the intrusions 110 and guide pin retention holes 113. Each guide pin retention hole 113 captures and retains a respective guide pin 106 via engaging a groove 114 as will be discussed in further detail below with reference to FIG. 5.

Each fiber optic ribbon 101 to be joined attaches to a respective multiple fiber connector plug 103A positioned at its joining end. A guide sleeve 123 is sized internally to receive two multiple fiber connector plugs 103A with some play, one plug 103A into each end. Along the centerline and on each lateral side of the interior of the guide sleeve 123 at the midpoint are two like intrusions 110. The intrusions 110 are positioned such that when the multiple fiber connector plugs 103A are inserted into the guide sleeve 123, the intrusions 110 are oriented with and disposed in the notches 118 on the faces of the multiple fiber connector plugs 103A, thereby facilitating face-to-face connector plug contact and contact of the optical fibers 102 in particular.

The faces of the multiple fiber connector plugs 103A abut each other within the guide sleeve 123 such that the extended fiber arrays in each multiple fiber connector plug 103A are aligned to one another. In addition to the two multiple fiber connector plugs 103A and the guide sleeve 123, guide pins 106 are included for precision alignment. Capturing the guide pins 106 in the guide sleeve 123 is beneficial for many applications, including to avoid being broken off, bent, or damaged. Further, having two female-type multiple fiber connector plugs facilitates interchangeable parts that may be mass-produced and repaired or replaced with relative efficiency.

Figure 4:
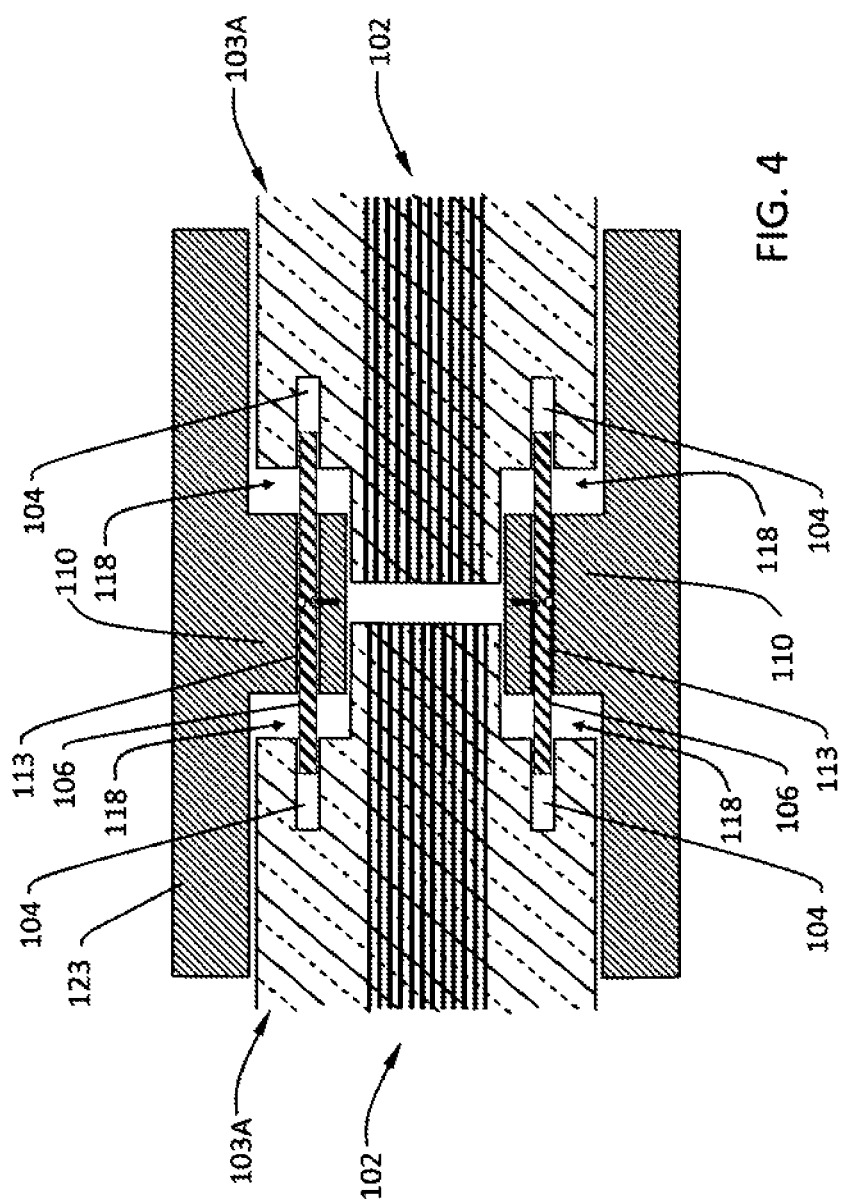
FIG. 4 illustrates a cross sectional view of an embodiment of an alignment connector assembly for multiple optical fibers in a connecting state in accordance with certain exemplary embodiments of the present invention.

FIG. 4 illustrates a cross-sectional top view of an exemplary embodiment of the alignment connector assembly according to the present invention. More specifically, FIG. 4 illustrates the multiple fiber connector plugs 103A in a state of being inserted into the guide sleeve 123, prior to face-to-face contact, such that a gap exists between opposing optical fibers 102.

In operation, the guide pins 106, which are retained in the guide sleeve 123, insert into the guide pin insertion holes 104 of the multiple fiber connector plugs 103A as the plugs 103A enter opposing ends of the guide sleeve 123. When the multiple fiber connector plugs 103A insert into the guide sleeve 123, the guide pins 106 mate with the guide pin insertion holes 104 and provide precision fiber-to-fiber alignment. The guide pins 106 typically have a degree of play or freedom of motion with respect to the intrusions 110 to facilitate feeding into the guide pin insertion holes 104, each of which can comprise a lead-in. Accordingly, the guide sleeve 123 provides sufficient alignment precision for the multiple fiber connector plugs 103A to place the guide pins 106 at the flared-out entrances of the guide pin insertion holes 104, and the guide pins 106 provide a much higher degree of alignment that supports aligning single mode cores of the optical fibers 102.

Each notch 118 can have a length, as measured along the optical fibers 102, that is greater than one-half the corresponding length of the intrusions 110. During the connection operation, the opposing optical fibers 102 contact in advance of the shoulders of the notches 118 hitting the opposing surfaces of the intrusions 110. Accordingly, when the multiple fiber connector plugs 103A are fully inserted in the guide sleeve 123 and mating is complete, the opposing optical fibers 102 are butted together, and separation exists between the intrusions 110 and the faces of the notches 118 that project perpendicular to the optical fibers 102.

In an exemplary embodiment, either multiple fiber connector plug 103A may fit into either end of the guide sleeve 123, facilitating easy repair and replacement without requiring specialized parts. The guide pins 106 may be inserted into the guide sleeve 123 prior to making a connection (such as either during manufacture or during a field procedure). Thus, the multiple fiber connector plugs 103A may be inserted into the guide sleeve 123 after the guide pins 106 are retained in the intrusions 110 of the guide sleeve 123. Accordingly, the guide pins 106 can be captured in the guide sleeve 123 prior to mating or at a factory during manufacture.

Figure 5:
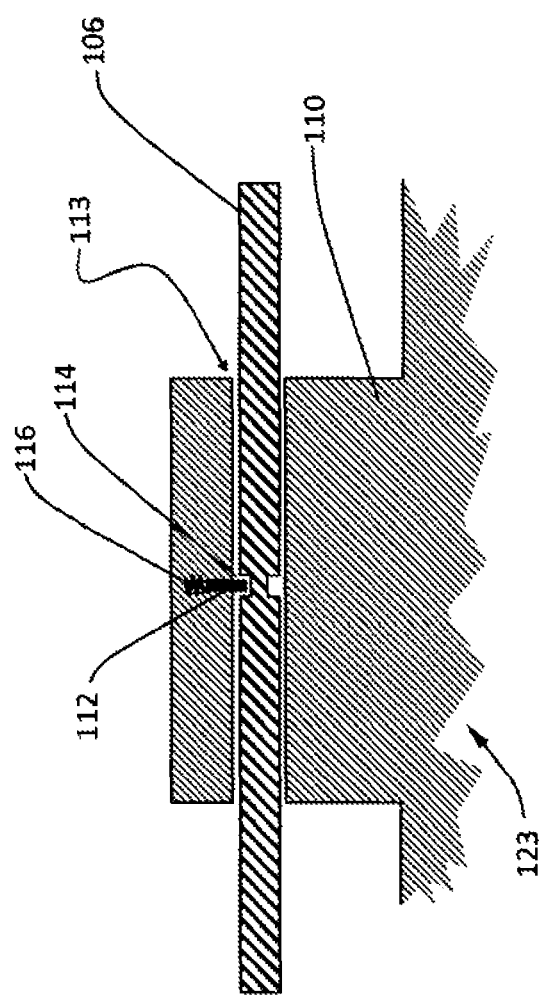
FIG. 5 illustrates a detail, cross-sectional view of an embodiment of an engaged capture pin of an alignment connector assembly for multiple optical fibers in accordance with certain exemplary embodiments of the present invention.

FIG. 5 provides further details of an exemplary embodiment of the guide sleeve 123. Disposed within each intrusion 110 is a guide-pin capture pin 112 that retains a guide pin 106. Inside the intrusion 110, behind the guide-pin capture pin 112 is a spring 116. The spring 116 urges or pushes the guide-pin capture pin 112 into place to engage the guide pin 106 when the guide pin 106 is installed in the intrusion 110. Accordingly, each guide pin 106 is captured and retained in a respective intrusion 110 and can remain with the intrusion 110 throughout multiple connection cycles that may involve different multiple fiber connector plugs 103A.

In the illustrated embodiment, each guide pin 106 comprises a groove 114 around its circumference at its midpoint or other appropriate location. When a guide pin 106 is inserted in a guide pin retention hole 113, the guide-pin capture pin 112 pushes back against the spring 113 until the guide pin 106 is sufficiently inserted for the guide-pin capture pin 112 to encounter the groove 114. When the guide-pin capture pin 112 encounters the groove 114, the spring 116 urges the guide-pin capture pin 112 into the groove 114, thereby retaining the guide pin 106 in the guide pin retention hole 113. With the groove 114 circumscribing the guide pin 106, the installation tolerates any rotational position of the guide pin 106 about the longitudinal axis of the guide pin 106. The guide-pin capture pin 112 further allows the guide pin 106 to pivot or float or otherwise provides play, so that the multiple fiber connector plugs 103A align to the guide pins 106 and so that the bore of the guide sleeve 123 can be slightly oversized to facilitate connection insertion.

In view of the foregoing, it will be appreciated that certain embodiments of the present invention can connect and align two fiber optic arrays using two female-type connectors and a mass-produced assembly that may be readily repaired and/or replaced. An exemplary connector system can include connectors attached to the ends of fiber ribbons and a connector guide sleeve that stabilizes and holds the connectors together. The guide sleeve can provide a sufficient level of alignment of the connectors so that floating guide pins can provide higher, precision alignment when mated with opposing holes on the connectors during connection. Those holes can be offset from and recessed relative to the ends of the optical fibers, for example in respective notches.

Each guide pin can be inserted through a hole in the guide sleeve while a spring urges a capture pin laterally towards the guide pin. At an appropriate insertion depth, the capture pin can seat in an indentation or groove of the guide pin, thereby retaining the guide pin in the guide sleeve. The capture pins and associated springs can allow a predetermined level of play of the guide pins. With such play, female-type connectors can accept the guide pins (typically with a lead-in), and the guide pins can take over and produce precise plug-to-plug and thus fiber array-to-fiber array alignment.

Technology useful for connecting arrays of optical fibers has been described. From the description, it will be appreciated that an embodiment of the present invention overcomes limitations of the prior art. Those skilled in the art will appreciate that the present invention is not limited to any specifically discussed application or implementation and that the embodiments described herein are illustrative and not restrictive. Furthermore, the particular features, structures or characteristics that are disclosed may be combined in any suitable manner in one or more embodiments based on this disclosure and ordinary skill. Those of ordinary skill having benefit of this disclosure can make, use, and practice a wide range of embodiments via combining the disclosed features and elements in many permutations without undue experimentation. This disclosure not only includes the illustrated and described embodiments, but also provides a rich and detailed roadmap for creating many additional embodiments using the various disclosed technologies, elements, features, and their equivalents. From the description of the exemplary embodiments, equivalents of the elements shown herein will suggest themselves to those skilled in the art, and ways of constructing other embodiments of the present invention will appear to practitioners of the art. Therefore, the scope of the present invention is to be limited only by the accompanying claims.

What is claimed is:

1. A fiber optic connector system, comprising:
   two fiber optic connector plugs, each of the plugs terminating a respective end of a fiber optic ribbon, and each of the plugs comprising:

a face from which an array of optical fibers extends,
a first hole sized to receive a first guide pin, and
a second hole sized to receive a second guide pin; and
a sleeve comprising:
  opposite ends sized to receive the two fiber optic connector plugs,
  a first intrusion projecting into a bore of the sleeve, a portion of the first guide pin being located within the first intrusion, and
  a second intrusion projecting into the bore of the sleeve, a portion of the second guide pin being located within the second intrusion.

2. The fiber optic connector system of claim 1, wherein:
the opposite ends of the sleeve comprise a first end and a second end;
each of the intrusions has a first end and a second end;
the first guide pin extends beyond the ends of the first intrusion but does not extend beyond the ends of the sleeve; and
the second guide pin extends beyond the ends of the second intrusion but does not extend beyond the ends of the sleeve.

3. The fiber optic connector system of claim 2, wherein each of the fiber optic connector plugs comprises a first notch on a first lateral side of the face and a second notch on a second lateral side of the face, with the first hole disposed in the first notch and the second hole disposed in the second notch.

4. The fiber optic connector system of claim 3, wherein the notches are sized to accommodate the first and second intrusions.

5. The fiber optic connector system of claim 3, wherein the first and second intrusions are spaced apart to allow part of the face of each of the fiber optic connector plugs to extend between the first and second intrusions.

6. The fiber optic connector system of claim 1, wherein the holes of each of the fiber optic connector plugs are sized to accommodate the respective guide pins.

7. The fiber optic connector system of claim 1, wherein the sleeve further comprises:
  a first spring disposed at least partially within the first intrusion; and
  a second spring disposed at least partially within the second intrusion.

8. The fiber optic connector system of claim 1, wherein:
the first intrusion comprises a first capture pin seated in a groove of the first guide pin; and
the second intrusion comprises a second capture pin seated in a groove of the second guide pin.

9. The fiber optic connector system of claim 8, wherein:
a first spring urges the first capture pin against a lateral surface of the first guide pin; and
a second spring urges the second capture pin against a lateral surface of the second guide pin.

10. A fiber optic connection system, comprising:
a first array of optical fibers leading to and terminating substantially at a first face of a first connector;
a second array of optical fibers leading to and terminating substantially at a second face of a second connector; and
a sleeve comprising:
  a first aperture on a first end of the sleeve and sized to receive the first connector,
  a second aperture on a second end of the sleeve and sized to receive the second connector, and
  a plurality of pins, the pins extending into the first aperture and the second aperture but not extending beyond the first end of the sleeve or the second end of the sleeve;
wherein the first connector comprises a first plurality of holes sized to receive first ends of the plurality of pins when the first connector is inserted into the first aperture;
wherein the second connector comprises a second plurality of holes sized to receive second ends of the plurality of pins when the second connector is inserted into the second aperture; and
wherein ends of the optical fibers of the first array and ends of the optical fibers of the second array are butted together when the first connector and the second connector are inserted into the sleeve.

11. The fiber optic connection system of claim 10, wherein the pins have substantial pivoting play relative to the sleeve when the first aperture and the second aperture are open.

12. The fiber optic connection system of claim 10, wherein:
the first array of optical fibers comprises a first two-dimensional array of optical fibers, and
the second array of optical fibers comprises a second corresponding, two-dimensional array of optical fibers.

13. The fiber optic connection system of claim 10, wherein:
the first array of optical fibers comprises a first linear array of optical fibers; and
the second array of optical fibers comprises a second, corresponding, linear array of optical fibers.

14. The fiber optic connection system of claim 10, wherein:
the plurality of pins is a pair of pins;
the sleeve further comprises a pair of intrusions projecting into a bore of the sleeve; and
a portion of each pin of the pair of pins is located within one of the intrusions.

15. The fiber optic connection system of claim 14, wherein:
the first connector comprises a first pair of notches sized to accommodate the pair of intrusions; and
the second connector comprises a second pair of notches sized to accommodate the pair of intrusions.

16. The fiber optic connection system of claim 11, further comprising a plurality of capture pins, wherein each of the capture pins applies a lateral force to a corresponding one of the pins, and wherein each of the pins is retained within the sleeve but can pivot within the sleeve.

17. A fiber optic connector system, comprising:
a sleeve having a bore, a first end and a second end;
a pair of alignment pins retained within the bore of the sleeve, one end of each of the alignment pins extending toward the first end of the sleeve, and an opposite end of each of the alignment pins extending toward the second end of the sleeve, each of the alignment pins being pivotable within the sleeve;
a first plug, sized for insertion into the bore and at the first end of the sleeve, and configured to accept a first array of optical fibers;
a second plug, sized for insertion into the bore and at the second end of the sleeve, and configured to accept a second array of optical fibers,
wherein each of the plugs comprises two holes sized and positioned to receive respective ends of the two alignment pins.

18. The fiber optic connector system of claim 17, further comprising a pair of intrusions in the bore of the sleeve, and wherein each of the alignment pins is partially located within a respective intrusion, and extends beyond the respective intrusion, but does not extend beyond the ends of the sleeve.

19. The fiber optic connector system of claim 17, wherein:
- the first plug comprises a first notch on a first lateral side and a second notch on a second lateral side; and
- the second plug comprises a first notch on a first lateral side and a second notch on a second lateral side.

20. The fiber optic connector system of claim 19, wherein:
- the sleeve comprises a first intrusion projecting into the bore and a second intrusion projecting into the bore;
- the first notches are sized to accommodate the first intrusion when the first plug and second plug are inserted into the sleeve such that the ends of the optical fibers of the first array and ends of the optical fibers of the second array are butted together; and
- the second notches are sized to accommodate the second intrusion when the first plug and second plug are inserted into the sleeve such that the ends of the optical fibers of the first array and ends of the optical fibers of the second array are butted together.

21. The fiber optic connector system of claim 17, wherein the optical fibers are single mode optical fibers.

22. The fiber optic connector system of claim 17, wherein the sleeve comprises a pair of springs, each of the springs retaining one of the alignment pins within the bore.

23. The fiber optic connector system of claim 17, wherein the sleeve comprises a pair of capture pins, each of the capture pins retaining one of the alignment pins within the bore.

* * * * *